(12) United States Patent
Wycech

(10) Patent No.: US 10,131,072 B2
(45) Date of Patent: Nov. 20, 2018

(54) PELLET BASED TOOLING AND PROCESS FOR BIODEGRADEABLE COMPONENT

(71) Applicant: Joseph Wycech, Grosse Pointe Shores, MI (US)

(72) Inventor: Joseph Wycech, Grosse Pointe Shores, MI (US)

(*) Notice: Subject to any disclaimer, the term of this patent is extended or adjusted under 35 U.S.C. 154(b) by 1030 days.

(21) Appl. No.: 14/211,701

(22) Filed: Mar. 14, 2014

(65) Prior Publication Data

US 2014/0265004 A1   Sep. 18, 2014

Related U.S. Application Data

(60) Provisional application No. 61/781,809, filed on Mar. 14, 2013.

(51) Int. Cl.
*B29B 9/12* (2006.01)
*B29B 9/06* (2006.01)
*B29B 9/16* (2006.01)

(52) U.S. Cl.
CPC ............... *B29B 9/06* (2013.01); *B29B 9/12* (2013.01); *B29B 2009/163* (2013.01)

(58) Field of Classification Search
CPC ...... C08L 55/02; C08L 53/025; C08L 101/00; C08L 2205/025; C08L 2205/03; C08L 101/14; C08L 2205/06; C08L 53/00; C08L 3/02; C08L 3/04; C08L 3/08; C08L 7/02; C08L 2201/06; C08L 2203/14; C08L 2201/54; C08L 2203/30; C08L 2207/04; C08L 2312/02; B29B 2009/163; B29B 9/06

See application file for complete search history.

(56) References Cited

U.S. PATENT DOCUMENTS

| | | |
|---|---|---|
| 3,655,034 A | 4/1972 | Stollman et al. |
| 3,670,064 A | 6/1972 | Edwards et al. |
| RE28,826 E | 5/1976 | Ladney, Jr. |
| 4,483,886 A * | 11/1984 | Kowalski ............... B29B 9/06 427/213 |

(Continued)

FOREIGN PATENT DOCUMENTS

| | | | |
|---|---|---|---|
| DE | 4228779 | 3/1994 | |
| EP | 0966500 A1 * | 12/1999 | ............... C08L 3/02 |

(Continued)

OTHER PUBLICATIONS

Video: Puff Extruder Cheese Ball Snack Puff Machine. Published to YouTube May 25, 2012. Retrieved Mar. 5, 2014 from https://www.youtube.com/watch?v=SUnBk1_nyuA.

(Continued)

*Primary Examiner* — Jacob T Minskey
*Assistant Examiner* — Cedrick S Williams
(74) *Attorney, Agent, or Firm* — Carlson, Gaskey & Olds, P.C.

(57) ABSTRACT

An example method of forming a biodegradable component includes extruding the biodegradable material through a die. The extruded biodegradable material is divided to form a plurality of biodegradable pellets. A binding agent is applied onto the biodegradable pellets. The plurality of biodegradable pellets with the binding agent are compressed in a mold to form a biodegradable component corresponding to the geometry of the mold.

20 Claims, 5 Drawing Sheets

(56) References Cited

U.S. PATENT DOCUMENTS

| | | | |
|---|---|---|---|
| 4,653,362 A | 3/1987 | Gerber | |
| 4,735,761 A | 4/1988 | Lindenberger | |
| 4,737,407 A * | 4/1988 | Wycech | B29B 9/06 264/143 |
| 4,828,115 A | 5/1989 | Wiegand et al. | |
| 4,885,317 A | 12/1989 | Thein et al. | |
| 4,946,359 A * | 8/1990 | Christen | B01J 2/10 118/303 |
| 5,413,855 A * | 5/1995 | Kolaska | B29B 9/06 428/320.2 |
| 5,511,667 A | 4/1996 | Carder | |
| 5,641,068 A | 6/1997 | Warner | |
| 5,709,827 A * | 1/1998 | Andersen | B01F 3/1214 264/102 |
| 5,863,858 A * | 1/1999 | Miller | C01B 32/384 502/180 |
| 5,897,944 A | 4/1999 | Loercks et al. | |
| 5,958,549 A | 9/1999 | Jaegers et al. | |
| 5,965,080 A | 10/1999 | Ando et al. | |
| 6,083,586 A | 7/2000 | Andersen et al. | |
| 6,136,255 A | 10/2000 | Ando et al. | |
| 6,167,790 B1 | 1/2001 | Bambara et al. | |
| 6,231,970 B1 * | 5/2001 | Andersen | C08L 3/02 106/145.1 |
| 6,365,090 B1 * | 4/2002 | Strait | C03B 37/14 264/143 |
| 6,440,354 B1 | 8/2002 | Takai et al. | |
| 6,494,704 B1 * | 12/2002 | Andersen | B29C 37/0007 425/258 |
| 7,332,214 B2 | 2/2008 | Ozasa et al. | |
| 7,452,927 B2 * | 11/2008 | Hayes | B32B 27/36 428/357 |
| 7,820,002 B2 | 10/2010 | Wycech | |
| 8,043,539 B2 | 10/2011 | Ozasa et al. | |
| 9,327,438 B2 * | 5/2016 | Wang | B29C 47/0004 |
| 2003/0107145 A1 | 6/2003 | Ozasa et al. | |
| 2003/0211351 A1 * | 11/2003 | Figiel | C09J 5/00 428/537.5 |
| 2003/0236371 A1 | 12/2003 | Wilson, Jr. et al. | |
| 2005/0235445 A1 | 10/2005 | Wycech | |
| 2009/0176903 A1 * | 7/2009 | Muenz | C08J 9/0061 521/91 |
| 2010/0311638 A1 * | 12/2010 | Tiege | B29B 9/16 514/1.1 |
| 2012/0328804 A1 * | 12/2012 | Allen | C08L 23/10 428/34.1 |
| 2013/0065055 A1 * | 3/2013 | Bastioli | C08J 7/123 428/407 |
| 2013/0171393 A1 * | 7/2013 | Kannankeril | C08L 3/02 428/36.9 |
| 2014/0069344 A1 * | 3/2014 | Lipscomb | A01K 1/0107 119/171 |

FOREIGN PATENT DOCUMENTS

| | | | |
|---|---|---|---|
| GB | 2352230 | 7/1999 | |
| WO | WO 1998036018 A1 * | 8/1998 | C08J 3/20 |

OTHER PUBLICATIONS

Video: Cheese Curl Step #1—Extruder. Published to YouTube Jul. 26, 2009. Retrieved Mar. 5, 2014 from https://www.youtube.com/watch?v=Kc2Xl7qilkc.

* cited by examiner

PELLET BASED TOOLING AND PROCESS FOR BIODEGRADEABLE COMPONENT

CROSS-REFERENCE TO RELATED APPLICATIONS

This application claims priority to U.S. Provisional Patent Application No. 61/781,809 filed on Mar. 14, 2013.

BACKGROUND

This disclosure relates to biodegradable components and more particularly to the manufacture and forming of starch-based biodegradable components using biodegradable pellets, and tooling and processes for both starch-based biodegradable components and biodegradable pellets.

Polystyrene foam is known and used as a packaging material for shipping, household items, cars, and other areas of manufacture and transportation. For instance, polystyrene foam materials are used to prevent damage to manufactured items during transportation, as well as adding stability to packaging during the shipping process. Many times, these materials are made using pre-cut or sized blanks of foam and then cavitating the pre-cut blank. Other non-biodegradable materials are used for a variety of business, shipping, and household applications.

SUMMARY

An example method of forming a biodegradable component includes extruding the biodegradable material through a die. The extruded biodegradable material is divided to form a plurality of biodegradable pellets. A binding agent is applied onto the biodegradable pellets. The plurality of biodegradable pellets with the binding agent are compressed in a mold to form a biodegradable component corresponding to the geometry of the mold.

An example system for making biodegradable components includes an extruder including an extrusion die. The extruder holds a mixture comprising a biodegradable material and a blowing agent. The example system includes a cutter disposed adjacent the extruder and arranged to cut the biodegradable material into a plurality of biodegradable pellets corresponding to a desired geometry. A tumbler configured to tumble the plurality of biodegradable pellets. An application device is arranged to deposit a binding agent onto the plurality of biodegradable pellets. At least one mold configured to compress the plurality of biodegradable pellets in the at least one mold forming a biodegradable component having a geometry corresponding to the geometry of the at least one mold.

DETAILED DESCRIPTION

Figure 1:
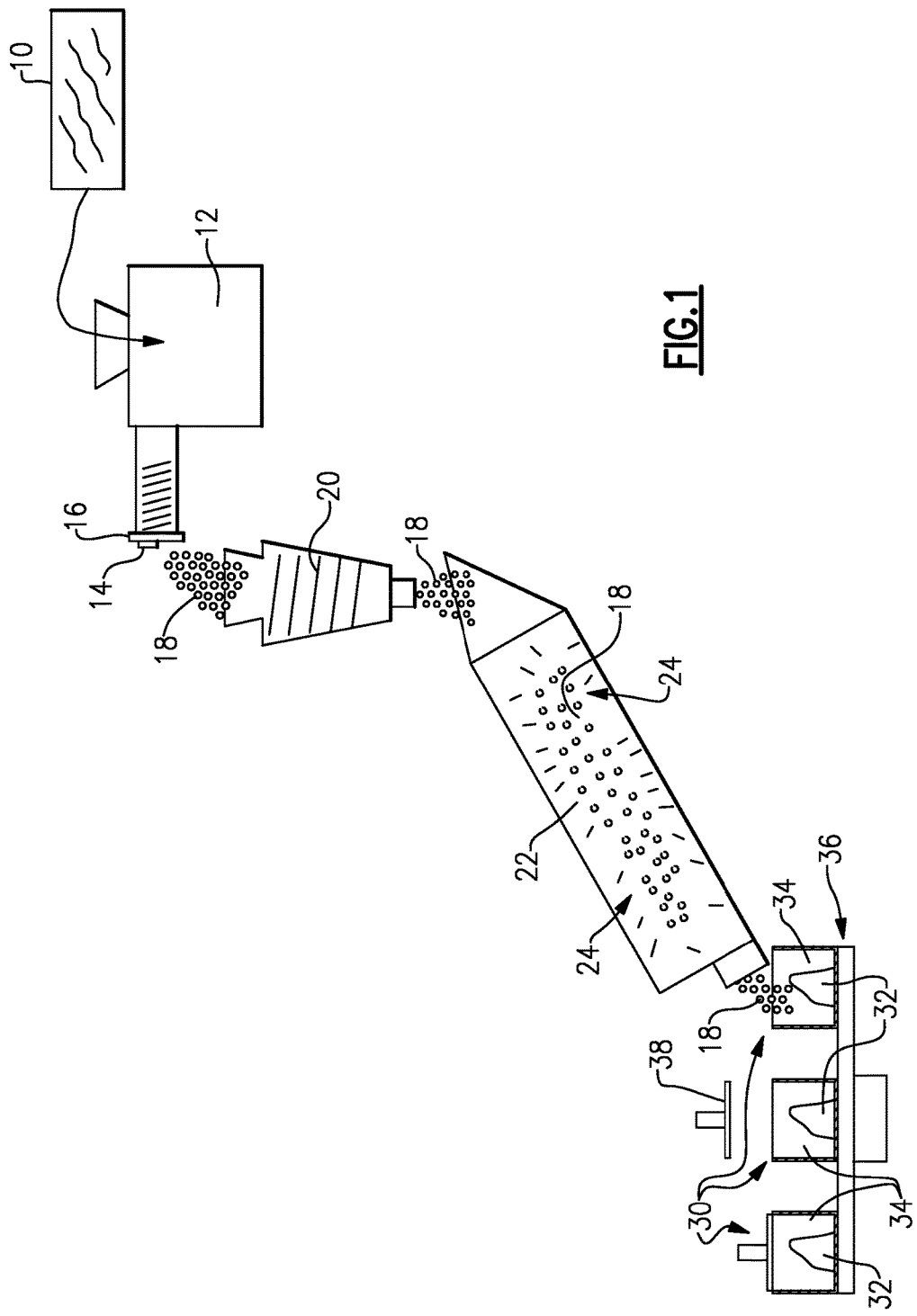
FIG. 1 is a perspective view of an example process and tooling to create biodegradable components.

Referring to FIG. 1, an example process, and corresponding tooling, to create biodegradable components and biodegradable pellets is shown. A starch-based biodegradable material 10, shown schematically, is provided. In one example, the starch-based material is dissolvable in water. In another example, the biodegradable material 10 is formed of a corn-based cellulosic material ("greencell") or other cellulose based material. In another example, the biodegradable material 10 is formed by providing starch flour with high amylose content and mixing the starch flour with water and additives. However, any biodegradable material may be used. ASTM International defines testing methods for determining whether a material is considered to be biodegradable.

The starch based biodegradable material 10 is provided to an extruder 12. In one example, the extruder 12 is a heated mix extruder. However, other types of extruders may be used. The extruder 12 is attached to a rotary cutter 14 and extrusion die 16 which are arranged to form a plurality of biodegradable pellets 18. In this example, the extruder 12 heats the biodegradable material 10 and forces the biodegradable material 10 through openings of the extrusion die 16. One or both of the extruder 12 and the extrusion die 16 are heated between 150° C. and 250° C. In one example, a material is added to the biodegradable material 10 in the extruder 12, or before the biodegradable material 10 is dispensed in the extruder, to enhance properties of the extruded biodegradable material 10 (in the form of biodegradable pellets 18 as will be described in further detail below). In this example, the material is a latex. However, other materials are contemplated.

The biodegradable material 10 emerges from the extrusion die 16 based on the geometry and arrangement of openings of the extrusion die 16. The biodegradable material 10 expands as it emerges from the extrusion die 16.

The extruded biodegradable material 10 is cut by the rotary cutter 14, which moves about the face of the extrusion die 16, to form the plurality of biodegradable pellets 18. The size of the plurality of biodegradable pellets 18 are determined by the size of the extrusion die 16 opening, the rate of extrusion, and the RPM of the rotary cutter 14. The plurality of biodegradable pellets 18 may be uniformly or non-uniformly formed. The length of the extruded biodegradable material 10 is cut to equal the length of the desired biodegradable pellet 18. In one example, to form round biodegradable pellets 18, the length of the cut extrusion is equal to a diameter of the expanded extruded biodegradable material 10.

In this example, the plurality of biodegradable pellets 18 are formed using the extrusion process and tooling described above. In another example, the plurality of biodegradable pellets 18 are pre-formed by manufacture using an independent process or at a different location, and subsequently provided for further manufacture without the use of the above extrusion process and tooling.

The plurality of biodegradable pellets 18 are dispensed in a tumbler 20. The plurality of biodegradable pellets 18 are tumbled in the tumbler 20 to form the plurality of biodegradable pellets 18 having a round, oval, or elliptical geometry. However, other shapes of plurality of biodegradable pellets 18 are contemplated. In one example, the plurality of biodegradable pellets 18 are tumbled while still heated to assist forming of the plurality of biodegradable pellets 18.

Round, oval, or elliptical shaped biodegradable pellets 18 provide a uniform surface for spray coating and are geometrically suitable for packing in a mold, as will be described in further detail below. Round, oval, or elliptical shaped biodegradable pellets 18 generally have less surface area than other geometric shapes to provide control of the amount of spray coating disposed on the plurality of biodegradable pellets 18 and prevent excessive absorption of spray coating.

In this example, the tumbler 20 is heated to a desired pre-determined temperature to shape the plurality of biodegradable pellets 18. The forming via heated tumbler 20 forms a shell on each of the plurality of biodegradable pellets 18.

The plurality of biodegradable pellets 18 are then disposed in a spray chamber 22. In another example, the plurality of biodegradable pellets 18 are sprayed without the use of spray chamber 22. The plurality of biodegradable pellets 18 are at a desired temperature when entering the spray chamber 22. The plurality of biodegradable pellets 18 are then sprayed in the spray chamber 22 with one or more binding agents 24.

In one example, the plurality of biodegradable pellets 18 are sprayed with a binding agent that is a natural oil or vegetable oil. The oil provides a water barrier or sealer for the plurality of biodegradable pellets 18.

In another example, the binding agent 24 is solid at room temperature and has a specific melt temperature above room temperature. The plurality of biodegradable pellets 18 are provided at room temperature, between 40° F. and 70° F. In one example, the binding agent is melted at a temperature of 135° F. and sprayed onto the plurality of biodegradable pellets 18. The plurality of biodegradable pellets 18 remain separated due to movement of the spray chamber 22. The plurality of biodegradable pellets 18 become tack free with continued movement of the spray chamber 22. The plurality of biodegradable pellets 18 are cooled in the spray chamber 22 and dispensed at room temperature.

In another example, the binding agent 24 is solid at room temperature and has a specific melt temperature above room temperature. The plurality of biodegradable pellets 18 are provided at a temperature above the melt temperature of the binding agent 24. In one example, the plurality of biodegradable pellets 18 are provided at a temperature of between 210° F. and 250° F. The binding agent 24 is melted at a temperature of 200° F. and is sprayed onto the plurality of biodegradable pellets 18. The plurality of biodegradable pellets 18 remain separated due to movement of the spray chamber 22. The plurality of biodegradable pellets 18 are cooled in the spray chamber 22 and dispensed at room temperature In another example, the binding agent 24 is liquid at room temperature. The plurality of biodegradable pellets 18 are frozen at or below 0° F., but at a temperature below the freezing point of the liquid binding agent 24. In one example, the binding agent 24 is sprayed onto the plurality of biodegradable pellets 18 at a temperature of 35 to 60 F. The binder agent 24 freezes on contact with the plurality of biodegradable pellets 18. The plurality of biodegradable pellets 18 remain separated from each other due to the movement of the spray chamber 22. The coated plurality of biodegradable pellets 18 are dispensed frozen.

In another example, the binding agent 24 is water. The plurality of biodegradable pellets 18 are provided at or below 40° F. The binding agent 24 is sprayed onto the plurality of biodegradable pellets 18 and roll coated in the spray chamber 22.

In another example, the binding agent 24 is a low viscosity liquid at room temperature. The plurality of biodegradable pellets 18 are provided at room temperature. In one example, the binding agent 24 is water or a water based adhesive that is sprayed onto the plurality of biodegradable pellets 18 at room temperature until the plurality of biodegradable pellets 18 begin to adhere together. The plurality of biodegradable pellets 18 absorb the binding agent 24 such that the pellets are tack free after continued movement in spray chamber 22 and are dispensed at room temperature.

In one example, the binding agent 24 is a dry particle which is disposed on the plurality of biodegradable pellets 18 by spraying or shaking just after the application of a different binding agent 24. Application of dry particle binding agents 24 provide separation between the coated plurality of biodegradable pellets 18, reduction or increase in adhesion between the coated plurality of biodegradable pellets 18, and/or allows addition of color, fragrance, and/or anti-bacterial features to the coated plurality of biodegradable pellets 18.

In one example, the binding agent 24 is at least one of dextrin (which is a low molecular-weight carbohydrate), starch based liquid adhesive, liquid soap, liquid glycerin soap, catalyzed room temperature or elevated cured liquid polyester, acrylic adhesive, urethane adhesive, epoxy adhesive, hot melt wax, solid glycerin bar soap, solid or water based epoxy, hot melt adhesive, and/or other liquid that is sprayed or dispensed at room temperature or above. The solid glycerin bar soap is heated to a temperature at or below 150° F., the solid epoxy is heated to a temperature at or below 220° F., and the hot melt adhesive is heated to a temperature at or below 360° F. The liquid glycerin soap is heated to a temperature at or below 135° F. and the hot melt wax is heated to a temperature at or below 140° F. Combinations of the above binding agents 24 are contemplated in this disclosure.

One or more binding agents 24 may be provided alone, or in combination using any of the above described methods.

After the plurality of biodegradable pellets 18 are coated with binding agent 24 in spray chamber 22, the plurality of biodegradable pellets 18 are dispensed in at least one mold 30 to form a component. Mold 30 may include one or more male parts 32 and female parts 34. The male parts 32 and female parts are three dimensional and formed based on a component to be shipped (not shown) or other desired shape. In this example, the plurality of biodegradable pellets 18 are dispensed based on at least one of weight or volume.

In one example, a plurality of molds 30 are disposed on a carousel 36 such that a plurality of molds 30 are rotated and provided with the plurality of biodegradable pellets 18 without adjusting the source of the plurality of biodegradable pellets 18. In this example, the number of molds 30 in the plurality of molds 30 is determined based on the number of biodegradable pellets 18 necessary for each mold 30, the type of binding agent 24, and the time necessary for the plurality of biodegradable pellets 18 to settle and adhere to one another in each mold 30.

In this example, the plurality of biodegradable pellets 18 are compressed in the mold 30 to form the component having performance characteristics based on one or more of the finished size of each of the plurality of biodegradable pellets 18, the finished stiffness of each of the plurality of biodegradable pellets 18, the binding agent 24 used, the finished surface porosity of each of the plurality of biodegradable pellets 18, the presence of a sealing shell on each of the plurality of biodegradable pellets 18, the thickness of the sealing shell, and/or the density of biodegradable pellets 18 within a given thickness of the component.

In one example, the plurality of biodegradable pellets 18 are compressed in the mold 30 using a compression plate 38. The compression plate 38 remains in place until the plurality of biodegradable pellets 18 form a component.

In one example, the molds 30 are heated to further aide adhesion of the plurality of biodegradable pellets 18 to one another. The density of the component is determined based on the compression of the plurality of biodegradable pellets 18, time in the mold 30, and the heat applied by the mold 30.

In one example, an adhesive, soap, glue or other material is provided in the mold 30 with the plurality of biodegradable pellets 18 to form the component.

Once the component is formed, the component may be removed from the mold 30 using ejector pins (not shown) or removal of portions of the mold 30 to allow the component to be retrieved.

The component formed using the above process and tooling has enhanced strength and moisture resistance because stress cracks are forced to follow irregular paths afforded by the plurality of biodegradable pellets 18.

Figure 2:
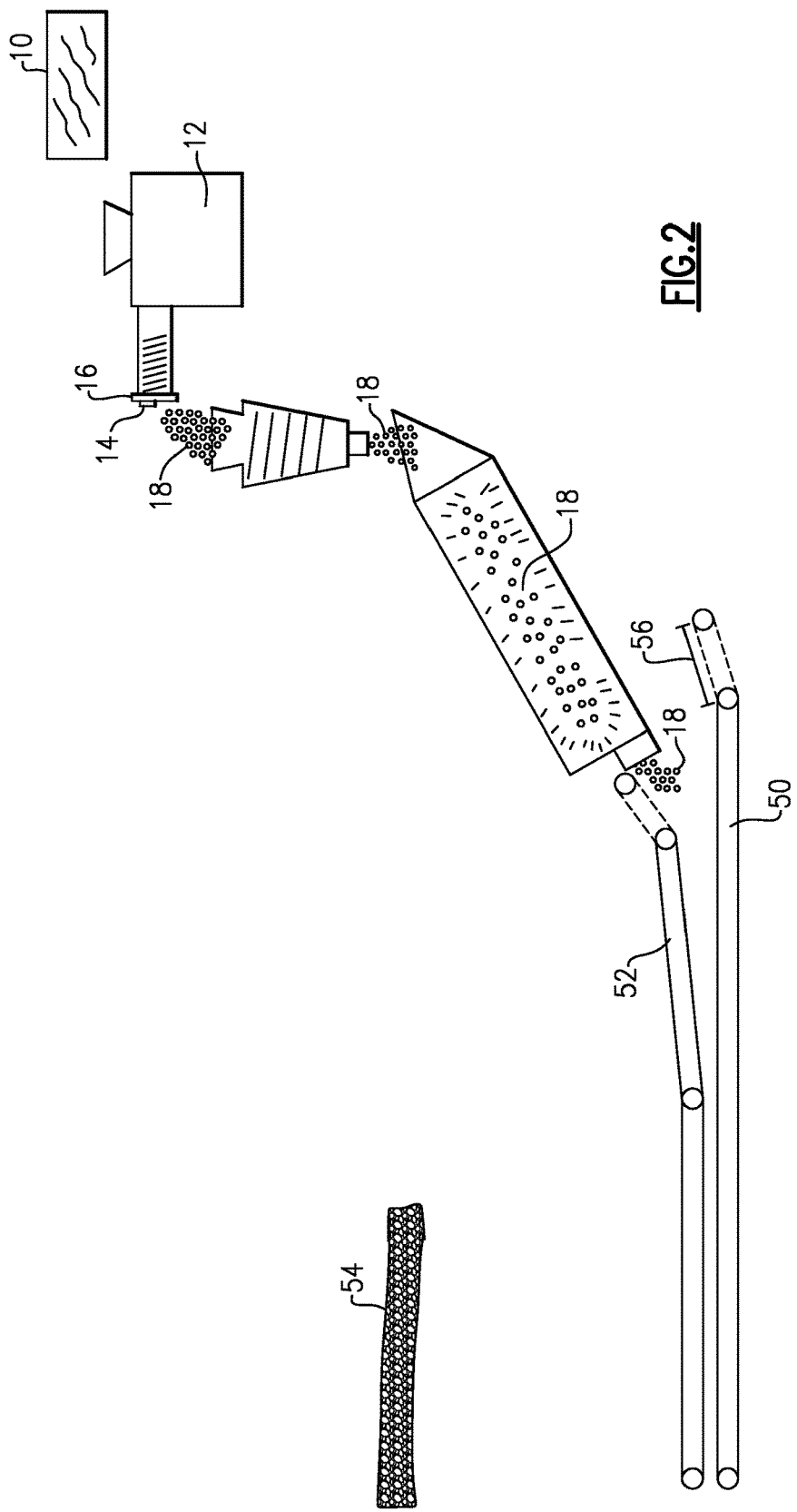
FIG. 2 is a perspective view of another example process and tooling to create biodegradable components.

Referring to FIG. 2, another example process, and corresponding tooling, to create biodegradable components and biodegradable pellets is shown. The process and tooling of FIG. 2 includes all of the features of the process and tooling of FIG. 1, except that FIG. 2 includes a first conveyor belt 50 and second conveyor belt 52 in place of carousel 36 and molds 30.

In this example, the first conveyor belt 50 and second conveyor belt 52 are spaced apart. The plurality of biodegradable pellets 18 are dispensed onto the first conveyor belt 50, between the first conveyor belt 50 and second conveyor belt 52. The first conveyor belt 50 and second conveyor belt 52 are temperature controlled to provide heat, as needed, to the plurality of biodegradable pellets 18. The first conveyor belt 50 and second conveyor belt 52 compress the plurality of biodegradable pellets 18 to form a single thickness plank 54 of biodegradable material.

In one example, the first conveyor belt 50 and the second conveyor belt 52 each have a width 56 between 12 inches and 53 inches.

Figure 3:
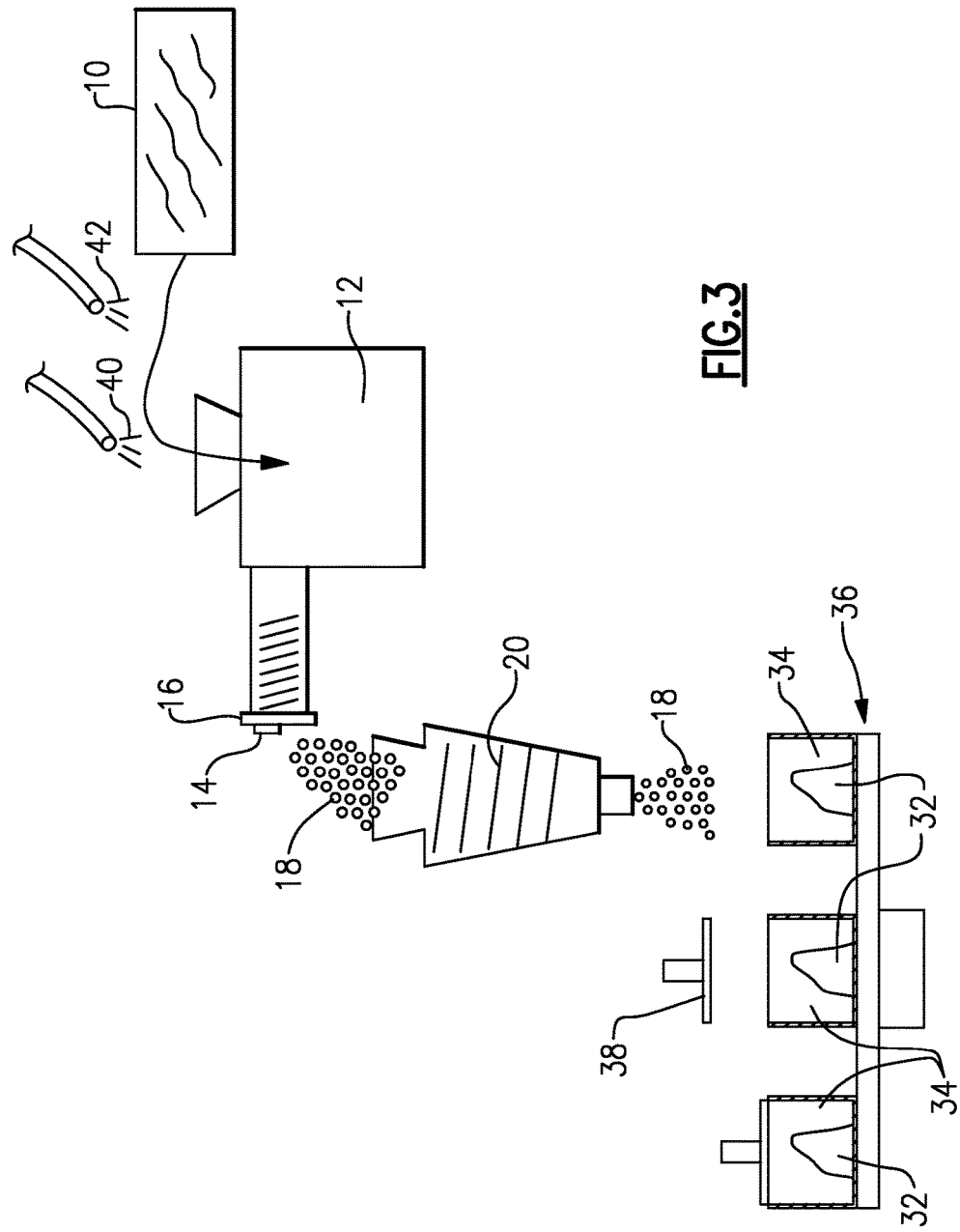
FIG. 3 is a perspective view of another example process and tooling to create biodegradable components.

Referring to FIG. 3, an example process, and corresponding tooling, to create biodegradable components and biodegradable pellets is shown. A starch-based biodegradable material 10, shown schematically, is provided. In one example, the starch-based material is dissolvable in water. In another example, the biodegradable material 10 is formed of a corn-based cellulosic material ("greencell") or other cellulose based material. In another example, the biodegradable material 10 is formed by providing starch flour with high amylose content and mixing the starch flour with water and additives. However, any biodegradable material may be used. ASTM International defines testing methods for determining whether a material is considered to be biodegradable.

The starch based biodegradable material 10 is provided to an extruder 12. In one example, the extruder 12 is a heated mix extruder. However, other types of extruders may be used. The extruder 12 is attached to a rotary cutter 14 and extrusion die 16 which are arranged to form a plurality of biodegradable pellets 18. In this example, the extruder 12 heats the biodegradable material 10 and forces the biodegradable material 10 through openings of the extrusion die 16. One or both of the extruder 12 and the extrusion die 16 are heated between 150° C. and 250° C.

In this example, an adhesion promoter 40, shown schematically, is added to the biodegradable material 10 in the extruder 12 or before the biodegradable material 10 is dispensed in the extruder to enhance bonding between the extruded biodegradable material 10 (in the form of biodegradable pellets 18), as will be described in further detail below. In this example, the adhesion promoter 40 is a water-soluble epoxy.

In one example a blowing agent 42, shown schematically, is added to the biodegradable material 10 in the extruder 12, or before the biodegradable material 10 is dispensed in the extruder, to cause post extrusion expansion. In one example, the blowing agent 42 is a two stage baking powder. The addition of blowing agent 42 assists in reducing openings between the plurality of biodegradable pellets 18 as they are compressed, as described in further detail below.

In another example, the blowing agent 42 is a plasticizer comprising polyvinyl butadiene, which provides additional ductility and toughness in the plurality of biodegradable pellets 18, and may be designed to cause expansion from heating in a tool, as will be described in further detail below.

The biodegradable material 10 emerges from the extrusion die 16 based on the geometry and arrangement of openings of the extrusion die 16. The biodegradable material 10 expands as it emerges from the extrusion die 16.

The extruded biodegradable material 10 is cut by the rotary cutter 14, which moves about the extrusion die 16, to form the plurality of biodegradable pellets 18. The plurality of biodegradable pellets 18 may be uniformly or non-uniformly formed. The size of the plurality of biodegradable pellets 18 is determined by the size of the extrusion die 16 opening, the rate of extrusion, and the RPM of the rotary cutter 14. The length of the extruded biodegradable material 10 is cut to equal the length of the desired biodegradable pellet 18. In one example, to form round biodegradable pellets 18, the length of the cut extrusion is equal to a diameter of the expanded extruded biodegradable material 10.

In this example, the plurality of biodegradable pellets 18 are formed using the extrusion process and tooling described above. In another example, the plurality of biodegradable pellets 18 may be pre-formed by manufacture using an independent process or at a different location, and subsequently provided for further manufacture without the use of the above extrusion process and tooling.

In one example, the plurality of biodegradable pellets 18 are dispensed directly to at least one mold 30, as will be described in further detail below.

In another example, the plurality of biodegradable pellets 18 are dispensed in a tumbler 20. The plurality of biodegradable pellets 18 are tumbled in the tumbler 20 to form the plurality of biodegradable pellets 18 having a round, oval, or elliptical geometry. However, other shapes of plurality of biodegradable pellets 18 are contemplated. In one example, the plurality of biodegradable pellets 18 are tumbled while still heated to assist forming of the plurality of biodegradable pellets 18.

Round, oval, or elliptical shaped biodegradable pellets 18 provide a uniform surface and are geometrically suitable for packing in a mold, as will be described in further detail below. Round, oval, or elliptical shaped biodegradable pellets 18 generally have less surface area than other geometric shapes for packing in the mold.

In this example, the tumbler 20 is heated to a desired pre-determined temperature to shape the plurality of biodegradable pellets 18. The heated tumbler 20 tumbles the plurality of biodegradable pellets 18 at a temperature below the extrusion temperature, but at a temperature high enough such that the plurality of biodegradable pellets 18 do not adhere together in the tumbler 20, but will be able to adhere when placed in a mold, as will be described in further detail below.

After the plurality of biodegradable pellets 18 are tumbled and heated, the plurality of biodegradable pellets 18 are dispensed in at least one mold 30 to form a component. Alternatively, the plurality of biodegradable pellets 18 are dispensed in the at least one mold 30 directly after extrusion. Mold 30 may include one or more male parts 32 and female parts 34. The male parts 32 and female parts are three dimensional and formed based on a component to be shipped (not shown) or other desired shape. In this example, the plurality of biodegradable pellets 18 is dispensed based on at least one of weight or volume.

In one example, a plurality of molds 30 are disposed on a carousel 36 such that a plurality of molds 30 are rotated and provided with the plurality of biodegradable pellets 18 without adjusting the source of the plurality of biodegradable pellets 18. In this example, the number of molds 30 in the plurality of molds 30 is determined based on the number of biodegradable pellets 18 necessary for each mold 30, the type of adhesion promoter 40, and the time necessary for the plurality of biodegradable pellets 18 to settle and adhere to one another in each mold 30.

In this example, the plurality of biodegradable pellets 18 are compressed in the mold 30 to form the component having performance characteristics based on one or more of the finished size of each of the plurality of biodegradable pellets 18, the finished stiffness of each of the plurality of biodegradable pellets 18, the adhesion promoter used, the finished surface porosity of each of the plurality of biodegradable pellets 18, and/or the density of biodegradable pellets 18 within a given thickness of the component.

In one example, the plurality of biodegradable pellets 18 are compressed in the mold 30 using a compression plate 38. The compression plate 38 remains in place until the plurality of biodegradable pellets 18 form a component.

In one example, the molds 30 are heated to further aide adhesion of the plurality of biodegradable pellets 18 to one another. The density of the component is determined based on the compression of the plurality of biodegradable pellets 18, time in the mold 30, and the heat applied by the mold 30.

In one example, an adhesive, soap, glue or other material is provided in the mold 30 with the plurality of biodegradable pellets 18 to form the component.

Once the component is formed, the component may be removed from the mold 30 using ejector pins (not shown) or removal of portions of the mold 30 to allow the component to be retrieved.

The component formed using the above process and tooling has enhanced strength and moisture resistance because stress cracks are forced to follow irregular paths afforded by the plurality of biodegradable pellets 18.

Figure 4:
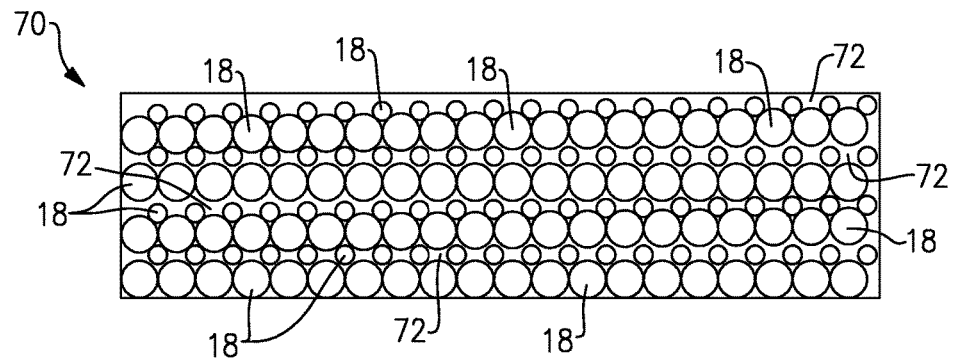
FIG. 4 is a cross-sectional view of a portion of an example component from one of the example process and tooling of FIGS. 1-3.

Referring to FIG. 4, a portion of an example component 70 formed of a plurality of biodegradable pellets 18 using any of the above processes and tooling is shown. In this example, the plurality of biodegradable pellets 18 are bonded together only at their contact points due being exposed to reduced compressive force. A plurality of air gaps 72 are disposed between the plurality of biodegradable pellets 18 of the component 70. Although an exemplary portion is shown, an example component having different geometric shapes and formations is contemplated.

Figure 5:
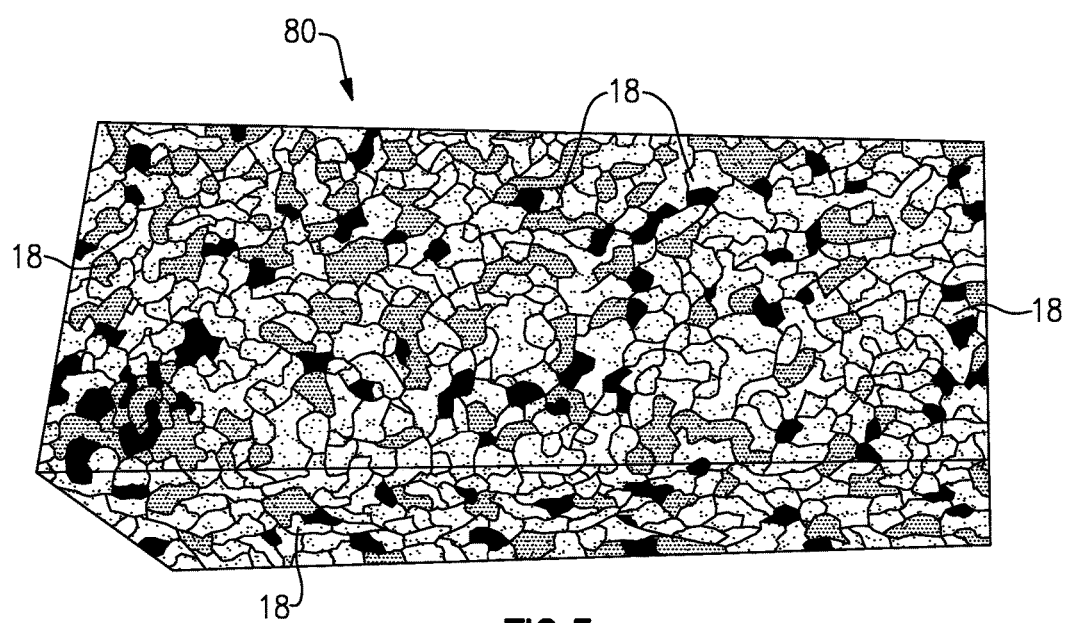
FIG. 5 is a perspective view of a portion of another example component from one of the example process and tooling of FIGS. 1-3.

Referring to FIG. 5, a portion of another example component 80 formed of a plurality of biodegradable pellets 18 using any of the above processes and tooling is shown. In this example, the plurality of biodegradable pellets 18 are bonded together and compressed such that all voids between each of the plurality of biodegradable pellets 18 are removed. In this example, the component 80 has a greater density and support strength than the example component 70 of FIG. 4. Although an exemplary portion is shown, example component having different geometric shapes and formations is contemplated.

Figure 6A:
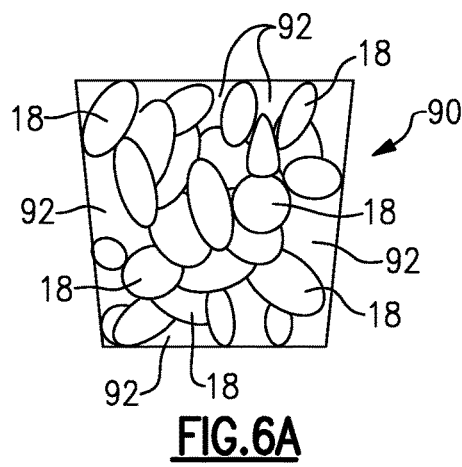
FIGS. 6A-6B is a perspective view of another example component from one of the example process and tooling of FIGS. 1 and 3.
Figure 6B:
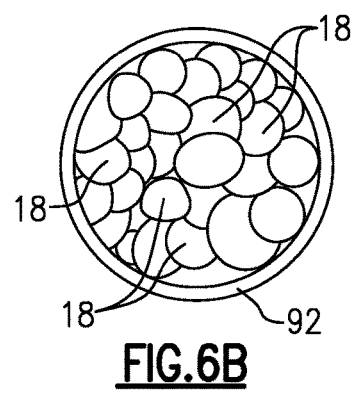
Figure 6C:
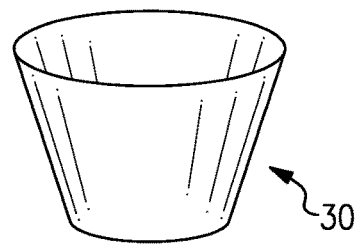
FIG. 6C is a perspective view of an example mold for the example components of FIGS. 6A-6B.

Referring to FIG. 6A-C, an example component 90 includes the plurality of biodegradable pellets 18 floating in a soap matrix 92. The plurality of biodegradable pellets 18 and soap 92 are dispensed in a mold 30. In this example, the mold 30 is a cup forming a component 90 having a round cross-sectional profile. In one example, the mold 30 is made of at least one of clear acrylic, plastic, paper, and metal, alone or in combination.

Figure 7:
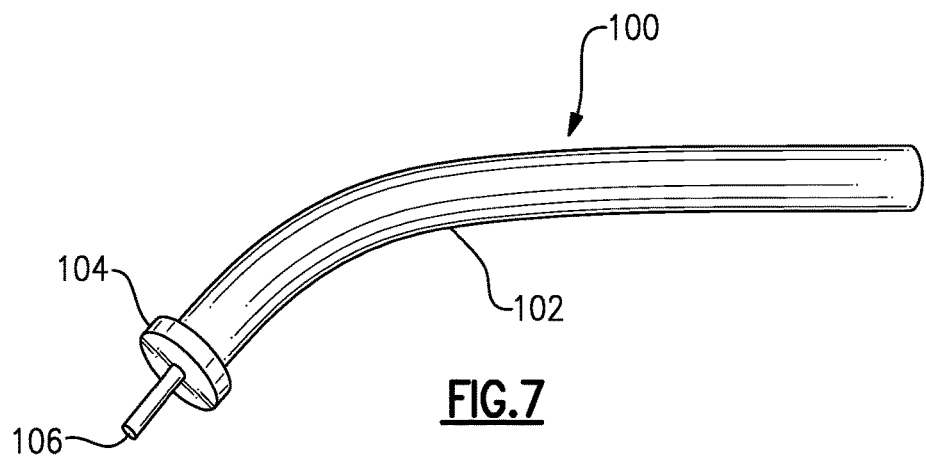
FIG. 7 is a perspective view of a tool for use with the component of FIG. 6A-6B.

Referring to FIG. 7, an example tool 100 is shown and includes a handle section 102, a seat 104, and a pin 106. The pin 106 is configured to engage the component 90 (shown in FIG. 6A-C) to attach the component 90 to the tool 100. In one example, the pin 106 is fixed. In another example, the pin 10 is retractable. The seat 104 is attached to the handle section 102 and the pin 106 and provides a surface 108 to contact the component 90 when the pin 106 engages component 90. The tool 100 provides manual manipulation of the component 90.

Although a preferred embodiment of this disclosure has been disclosed, a worker of ordinary skill in this art would recognize that certain modifications would come within the scope of this disclosure. For that reason, the following claims should be studied to determine the true scope and content of this disclosure.

What is claimed is:

1. A method of forming a biodegradable component, the method comprising:
    extruding the biodegradable material through a die;
    dividing the extruded biodegradable material to form a plurality of biodegradable pellets;
    applying a binding agent onto the plurality of biodegradable pellets; and
    compressing the plurality of biodegradable pellets with the binding agent in a mold to form a biodegradable component corresponding to the geometry of the mold, wherein the binding agent is at a first temperature during the applying, and wherein the binding agent is cooled to a second, lower temperature prior to compressing such that the building agent freezes onto the plurality of biodegradable pellets.

2. The method of claim 1, further comprising tumbling the plurality of biodegradable pellets to alter the shape of the plurality of biodegradable pellets prior to the applying the binding agent.

3. The method of claim 1, further comprising tumbling the plurality of biodegradable pellets, wherein the tumbling includes heating the plurality of extruded biodegradable pellets to alter the surface of the plurality of extruded biodegradable pellets to include a sealing shell.

4. The method of claim 3, wherein the tumbling shapes of the plurality of biodegradable pellets to have an elliptical profile.

5. The method of claim 1, wherein the binding agent includes an aqueous material.

6. The method of claim 1, wherein the binding agent includes dextrin.

7. The method of claim 1, wherein the binding agent includes at least one of liquid soap, liquid glycerin soap, and solid glycerin bar soap.

8. The method of claim 1, wherein the binding agent is a mixture consisting of water, a carbon-chain material, and a surfactant.

9. The method of claim 1, further comprising compressing the plurality of biodegradable pellets in a plurality of molds disposed on a rotatable carousel, wherein the compressing includes compressing a first amount of the plurality of biodegradable pellets into a first mold of the plurality of molds, rotating a carousel to position a second mold of the plurality of molds to receive a second amount of the plurality of biodegradable pellets, and compressing the second amount of the plurality of biodegradable pellets into a second mold of the plurality of molds.

10. The method of claim 1, further comprising adding an additive to the biodegradable material prior to extruding, wherein the additive includes at least one of latex, a blowing agent, and an adhesion promoter.

11. The method of claim 1, further comprising dispensing a matrix material into the mold with the plurality of biodegradable pellets prior to the compressing.

12. The method of claim 1, wherein the applying is performed in a chamber, wherein the plurality of biodegradable pellets are tack free before compression due to movement of the chamber causing movement of the plurality of biodegradable pellets during the applying.

13. A method of forming a biodegradable component, the method comprising:
 extruding the biodegradable material through a die;
 dividing the extruded biodegradable material to form a plurality of biodegradable pellets;
 applying a binding agent onto the plurality of biodegradable pellets, wherein the plurality biodegradable pellets are at a temperature between 40 and 70° F. or at a temperature between 210° F. and 250° F. before applying;
 compressing the plurality of biodegradable pellets with the binding agent in a mold to form a biodegradable component corresponding to the geometry of the mold, wherein the binding agent is at a first temperature during the applying, and wherein the binding agent is cooled to a second, lower temperature prior to compressing; and
 melting a binding agent, wherein applying includes applying the melted binding agent on the plurality of biodegradable pellets.

14. The method of claim 13, wherein the plurality of biodegradable pellets are heated to a temperature between 210° F. and 250° F. before applying.

15. The method of claim 1, wherein the binding agent is applied to the plurality of biodegradable pellets by spraying in a spray chamber.

16. The method of claim 15, wherein the plurality of biodegradable pellets remain separated during the spraying due to movement of the spray chamber.

17. The method of claim 1, wherein the binding agent includes a first binding agent and a second binding agent, and one of the first and second binding agents is a dry particle.

18. The method of claim 1, wherein the biodegradable material is dissolvable in water.

19. A method of forming a biodegradable component, the method comprising:
 extruding the biodegradable material through a die;
 dividing the extruded biodegradable material to form a plurality of biodegradable pellets;
 applying a binding agent onto the plurality of biodegradable pellets; and
 compressing the plurality of biodegradable pellets with the binding agent in a mold to form a biodegradable component corresponding to the geometry of the mold, wherein the binding agent is at a first temperature between 35° F. to 60° F. during the applying and the binding agent is cooled to a second, lower temperature prior to compressing; and
 cooling the plurality of biodegradable pellets to a temperature at or below 0° F. prior to the applying.

20. The method of claim 13, wherein the plurality of biodegradable pellets are at a temperature between 40° F. and 70° F. during the applying.

* * * * *